United States Patent
Zhong et al.

(10) Patent No.: US 11,500,666 B2
(45) Date of Patent: Nov. 15, 2022

(54) CONTAINER ISOLATION METHOD AND APPARATUS FOR NETLINK RESOURCE

(71) Applicant: HUAWEI TECHNOLOGIES CO., LTD., Shenzhen (CN)

(72) Inventors: Guocheng Zhong, Dongguan (CN); Liang Zhang, Shenzhen (CN); Jianrui Yang, Dongguan (CN); Jinmiao Liu, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 144 days.

(21) Appl. No.: 16/777,516

(22) Filed: Jan. 30, 2020

(65) Prior Publication Data
US 2020/0167186 A1 May 28, 2020

Related U.S. Application Data

(63) Continuation of application No. PCT/CN2018/095581, filed on Jul. 13, 2018.

(30) Foreign Application Priority Data

Jul. 31, 2017 (CN) .......................... 201710637129.7

(51) Int. Cl.
*G06F 9/455* (2018.01)
*G06F 9/54* (2006.01)
*G06F 9/30* (2018.01)

(52) U.S. Cl.
CPC ...... *G06F 9/45558* (2013.01); *G06F 9/30072* (2013.01); *G06F 9/542* (2013.01); *G06F 9/545* (2013.01); *G06F 2009/45587* (2013.01)

(58) Field of Classification Search
CPC .. G06F 9/45558; G06F 9/30072; G06F 9/542; G06F 9/545; G06F 2009/45587
See application file for complete search history.

(56) References Cited

U.S. PATENT DOCUMENTS

| 8,665,890 | B2 | 3/2014 | Yousefi'Zadeh et al. |
| 10,146,936 | B1 * | 12/2018 | Khanduja ............. G06F 21/552 |

(Continued)

FOREIGN PATENT DOCUMENTS

| CN | 101330390 A | 12/2008 |
| CN | 102349276 A | 2/2012 |

(Continued)

OTHER PUBLICATIONS

International search report dated Sep. 26, 2018 from corresponding application No. PCT/CN2018/095581.
Wolfgang Mauerer,"Professional Linux Kernel Architecture",dated Dec. 31, 2008,total 20 pages.
Pablo Neira Ayuso et al.,"Communicating between the kernel and user-space in Linux using Netlink sockets", Software Practice and Experience Softw. Pract. Exper. 2010; total 17 pages.

(Continued)

*Primary Examiner* — Emerson C Puente
*Assistant Examiner* — Jonathan R Labud
(74) *Attorney, Agent, or Firm* — Hauptman Ham, LLP

(57) ABSTRACT

A container isolation method for a netlink resource includes receiving, by a kernel executed by a processor, a trigger instruction from an application program. The method also includes creating, by the kernel according to the trigger instruction, a container corresponding to the application program, creating a netlink namespace for the container, and sending a notification to the application program indicating that the netlink namespace is created. The method further includes receiving, by the kernel, a netlink message from the container, wherein the netlink message comprises entries generated when the container runs. The method additionally includes storing, by the kernel, the entries based on an identifier of the netlink namespace for the container, to send an entry required by the container to user space of the container.

20 Claims, 7 Drawing Sheets

(56) References Cited

U.S. PATENT DOCUMENTS

| | | | |
|---|---|---|---|
| 2007/0130621 A1* | 6/2007 | Marinescu | G06F 21/6281 |
| | | | 726/22 |
| 2010/0138569 A1 | 6/2010 | Fuerst et al. | |
| 2011/0161988 A1 | 6/2011 | Kashyap | |
| 2012/0192207 A1 | 7/2012 | Kashyap | |
| 2013/0133061 A1* | 5/2013 | Fainkichen | G06F 9/45558 |
| | | | 726/15 |
| 2014/0337336 A1 | 11/2014 | Carlson | |
| 2015/0317169 A1* | 11/2015 | Sinha | H04L 61/2076 |
| | | | 713/2 |
| 2016/0283301 A1 | 9/2016 | Govindarajalu et al. | |
| 2017/0026845 A1* | 1/2017 | Garg | H04W 16/10 |
| 2017/0257357 A1* | 9/2017 | Wang | H04L 9/12 |
| 2018/0074839 A1* | 3/2018 | Pachlore | G06F 9/445 |

FOREIGN PATENT DOCUMENTS

| | | | |
|---|---|---|---|
| CN | 103514030 A | | 1/2014 |
| CN | 103716244 A | | 4/2014 |
| CN | 105487933 A | | 4/2016 |
| CN | 105550576 A | | 5/2016 |
| CN | 105939365 A | | 9/2016 |
| CN | 106095413 A | | 11/2016 |
| KR | 20050051277 A | | 6/2005 |

OTHER PUBLICATIONS

Yu Dong et al.,"Analysis of Communications Between Kernel-Space and User-Space Based on Netlink Mechanism", dated Dec. 31, 2007,total 3 pages.

Yin Jiasheng et al., "Research on Traffic Collection and Analysis Model Based on Linux in a High-speed Network", Computer Engineering and Applications, Oct. 2016, with an English abstract, total 4 pages.

Chinese Notice of Allowance issued in corresponding Chinese Application No. 201710637129.7, dated Jun. 25, 2021, pp. 1-4.

XP055688563 Wolfgang Mauerer,"Linux Kernel Architecture",Wiley Publishing, Inc.,dated 2008,total 1370 pages.

XP007917852 Pablo Neira Ayuso et al.,"Communicating between the kernel and user-space in Linux using Netlink sockets",Software Practice And Experience,Prepared using speauth.cls [Version: Sep. 23, 2002 v2.2],total 17 pages.

Extended European search report dated May 13, 2020 from corresponding application No. EP 18841240.7.

Luke, Kai: "Interaction Between the User and Kernel Space in Linux", Jun. 1, 2017, XP055863653, Retrieved from the Internet:URL:http://pothos.blogsport.eu/files/2018/01/linux_userspace_kernel_interaction.pdf, total 5 pages.

European Office Action issued in corresponding European Application No. 18841240.7, dated Feb. 2, 2022, pp. 1-5, European Patent Office, Rijswijk, Netherlands.

\* cited by examiner

CONTAINER ISOLATION METHOD AND APPARATUS FOR NETLINK RESOURCE

CROSS-REFERENCE TO RELATED APPLICATIONS

This application is a continuation of International Application No. PCT/CN2018/095581, filed on Jul. 13, 2018, which claims priority to Chinese Patent Application No. 201710637129.7, filed on Jul. 31, 2017. The disclosures of the aforementioned applications are hereby incorporated by reference in their entireties.

TECHNICAL FIELD

This application relates to the field of computer network technologies, and in particular, to a container isolation method and apparatus for a netlink resource.

BACKGROUND

A Linux container (LXC) is an operating system-level virtualization technology, and is used to isolate different Linux systems (also referred to as containers) on a host that use a same Linux kernel. The Linux container packages an application software system into a container, and the container may include user space. The user space is a storage area in which an application program runs, and the application program is executed based on resources (such as a CPU resource, a storage resource, and an I/O resource) provided by a kernel of a host on which the container is located.

Currently, a Linux namespace technology is used to isolate kernel resources allocated to different containers, so that system resources such as a process identifier (PID), an inter-process communication (IPC) channel, and a network forwarding entry are no longer global, but belong to a specific namespace. A resource in each namespace is non-transparent (or invisible) to another namespace. Briefly, resources are placed in different namespaces, resources in namespaces are isolated from each other, and the resources in the namespaces are invoked by different processes. Usually, one container corresponds to one container namespace, one container namespace may correspond to a plurality of containers, and the container namespace may include one or more sub-namespaces. When a kernel sends container subscription information to a container, the kernel may send the information to the container through a netlink channel by using a netlink message. FIG. 1 is a schematic diagram of a logical structure of an operating system. As shown in FIG. 1, the operating system is divided into user space and a kernel, the user space includes a container 1, a container 2, and a container 3, and the kernel includes a namespace 1 and a namespace 2. The container 1 and the container 3 correspond to the namespace 1, and the container 2 corresponds to the namespace 2. The namespace 1 and the namespace 2 each send corresponding container subscription information to the container 1, the container 2, and the container 3 through a netlink channel by using a netlink message.

However, a namespace of an existing container cannot be used to isolate netlink messages. In addition, because updates of entry resources (such as an ARP entry, a routing entry, and an interface entry) in a kernel are all sent to user space of a plurality of containers by using netlink messages in a multicast or broadcast manner. To be specific, a netlink message sent by the namespace 1 in FIG. 1 to the container 1 and the container 3 may also be received by the container 2. Consequently, all containers sharing the kernel receive the entry, causing entry broadcast flooding.

SUMMARY

This application provides a container isolation method and apparatus for a netlink resource, to isolate netlink resources, so that an entry on a kernel is received only by user space of a corresponding container after being broadcast by using a netlink message, thereby avoiding entry broadcast flooding caused by reception of the entry by all processes that share the kernel.

According to a first aspect, a container isolation method for a netlink resource is provided. The method may include: receiving, by a kernel, a trigger instruction that is used to create a container and that is delivered by an application program; creating, by the kernel according to the trigger instruction, a container corresponding to the application program, creating a netlink namespace for the container, and sending, to the application program, a notification indicating that the netlink namespace is successfully created; receiving, by the kernel, a first netlink message delivered by the container, where the first netlink message includes entries generated when the container runs; and storing, by the kernel, the entries based on an identifier of the netlink namespace, to send an entry required by the container to user space of the container.

According to the method, a netlink namespace mechanism is created, to isolate netlink channels, and reduce broadcast storms of netlink messages, thereby improving efficiency of processing a netlink multicast packet.

In an optional implementation, after the receiving, by the kernel, a first netlink message delivered by the container, the method further includes: parsing, by the kernel, the first netlink message, to obtain the identifier of the netlink namespace, so that the received entry is synchronously stored in a corresponding namespace in an isolated manner.

In an optional implementation, after the storing the entries, the method further includes: determining, by the kernel, an identifier of a netlink namespace corresponding to a target entry in the entries; determining, by the kernel, a target netlink namespace based on the identifier of the netlink namespace; and sending, by the kernel, the target entry to the user space of the container in a unicast or multicast manner based on an identifier of the target netlink namespace, where the target entry is all or some of the stored entries.

In an optional implementation, the sending, by the kernel, the target entry to the user space of the container in a unicast or multicast manner based on an identifier of the target netlink namespace includes: creating, by the kernel, a transmission channel between the container and the kernel based on the identifier of the target netlink namespace and the target entry; and sending, by the kernel, the target entry to the user space of the container through the channel in a unicast or multicast manner.

It can be learned that in a created netlink namespace mechanism, a netlink message sent by an entry management system in the kernel is received only by user space of a container generating an entry carried in the netlink message, thereby isolating netlink channels.

In an optional implementation, after the storing the entries, the method further includes: sending, by the kernel, a second netlink message to a forwarding plane used for inter-container communication, where the second netlink message includes a netlink namespace type and a target entry, so that the forwarding plane obtains an identifier of a netlink namespace to which the target entry belongs, and determining, based on the identifier of the netlink namespace to which the target entry belongs, a container corresponding to the target entry, where the target entry is all or some of the stored entries. Data in the user space can be forwarded in this manner, to reduce a data forwarding delay.

According to a second aspect, a container isolation apparatus for a netlink resource is provided. The apparatus has a function of implementing behavior of the kernel for a netlink resource in the foregoing method. The function may be implemented by hardware, or may be implemented by hardware by executing corresponding software. The hardware or software includes one or more modules corresponding to the foregoing function.

According to a third aspect, another container isolation apparatus for a netlink resource is provided. The apparatus may include: a processor and a memory. The memory is configured to store a program, the processor is configured to execute the program, and when the program is executed, the method in any one of the first aspect or the implementations of the first aspect can be implemented.

According to a fourth aspect, a computer program product including an instruction is provided. When the computer program product runs on a computer, the computer performs the method in any one of the first aspect or the implementations of the first aspect.

According to a fifth aspect, a computer readable storage medium is provided. The computer readable storage medium stores a computer program. When the program is executed by a processor, the method in any one of the first aspect or the implementations of the first aspect is performed.

BRIEF DESCRIPTION OF DRAWINGS

To describe the technical solutions in the discussed embodiments more clearly, the following briefly describes the accompanying drawings required for describing the embodiments.

DESCRIPTION OF EMBODIMENTS

The technical solutions of the present invention are further described below in detail with reference to the accompanying drawings and embodiments.

Related knowledge of Netlink is described first.

The Netlink is an asynchronous full-duplex communication mode, and supports a kernel mode (or referred to as a kernel) in actively initiating communication with user space. The Netlink provides a two-way full-duplex asynchronous transmission between a kernel and user space by using an inter-process communication method, and supports the kernel in actively initiating transmission communication with no need to initiate transmission communication by the user space (for example, in a simplex mode, for example, by using ioctl). In this way, the user space does not need to continuously perform polling when waiting for a trigger condition of the kernel to be met, and directly receives a kernel message asynchronously. In addition, the Netlink supports multicast transmission. In other words, the kernel may send a message to a plurality of receiving processes of the user space. In this way, each process does not need to independently perform querying.

Figure 1:
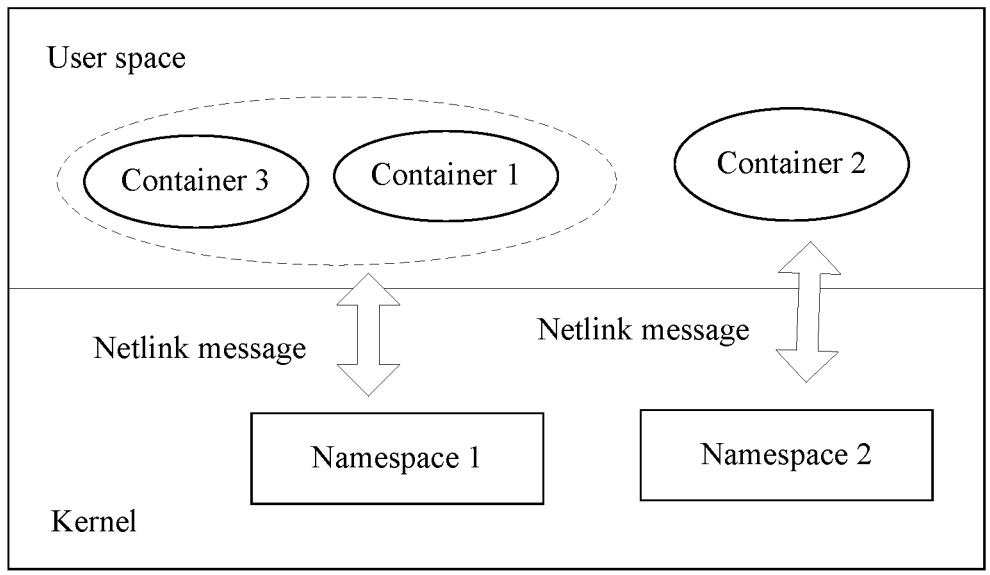
FIG. 1 is a schematic diagram of a logical structure of an operating system.
Figure 2:
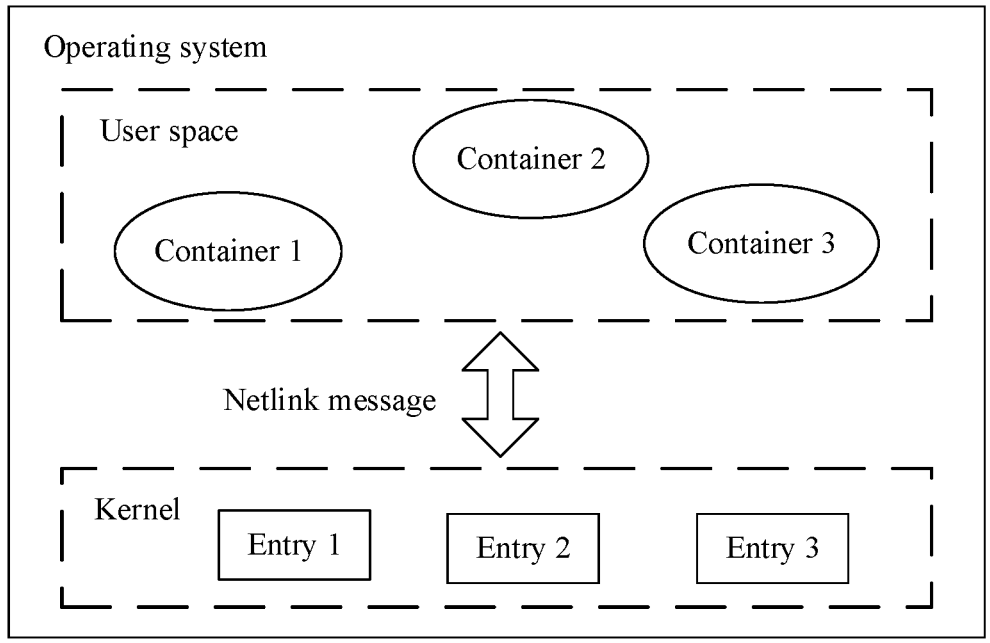
FIG. 2 is a schematic diagram of a logical structure of another operating system.

A container isolation method for a netlink resource provided in this application may be applied to an operating system shown in FIG. 2. As shown in FIG. 2, user space of the operating system may include a plurality of containers, such as a container 1, a container 2, and a container 3, and a kernel may include a plurality of entries (such as a routing entry, an ARP entry, and an interface entry), such as an entry 1, an entry 2, and an entry 3. The kernel stores and manages the entries. The kernel may receive, by using a netlink message, an entry delivered by a container, and the container may invoke an entry in the kernel by using a netlink message.

It should be noted that the operating system may be a Linux operating system, a Windows operating system, or another operating system that can implement a container technology.

A detailed description is provided below by using the Linux operating system as an example in this application.

In this application, a netlink namespace is first created for a container, and creation initialization is completed. User space may deliver a netlink trigger instruction to a kernel, so that the kernel creates a netlink namespace. Then the user space of the container performs unicast communication with the kernel by using a netlink message, and delivers an entry to the kernel, to isolate a netlink resource by using a newly added netlink namespace in a Linux container, especially to isolate the entry. One container corresponds to one container namespace, and one container namespace may correspond to a plurality of containers. Isolation means that a container to which a namespace belongs is not allowed to use or access a netlink channel of a container to which another namespace belongs.

When sending an entry in a multicast manner, the kernel sends the entry only to user space of a container with a namespace to which the entry belongs, and user space of another unrelated container does not receive the message.

In some scenarios, an entry of the kernel is sent to a forwarding plane of the user space (for example, a virtual switch in the user space) by using a netlink message, and the netlink message includes information indicating that the netlink message is about netlink namespace, so that a target container is distinguished on the user space, thereby implementing a data forwarding process, avoiding inter-container communication implemented by using the kernel, and reducing a communication delay.

Figure 3:
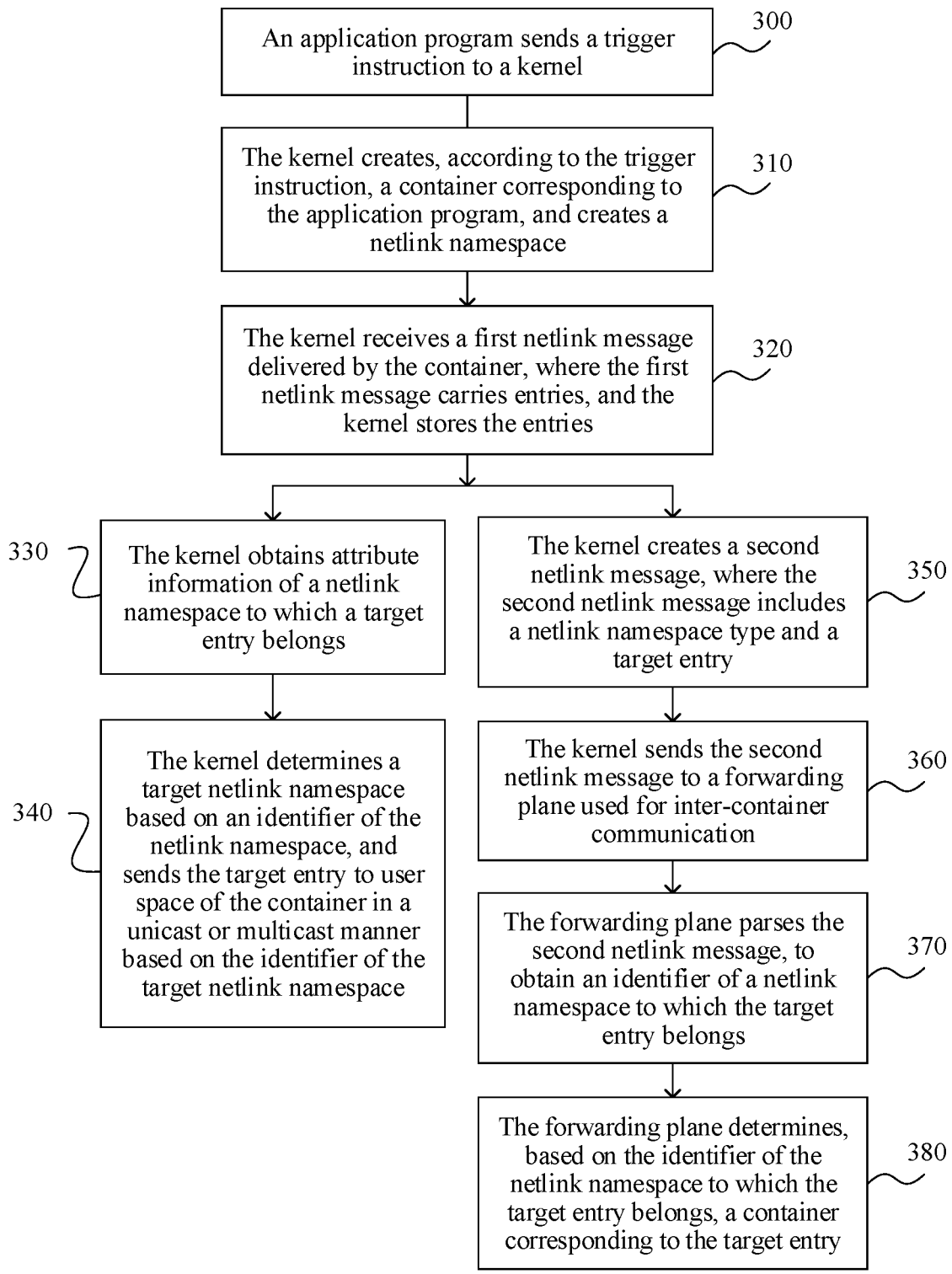
FIG. 3 is a schematic flowchart of a container isolation method for a netlink resource, in accordance with one or more embodiments.

FIG. 3 is a schematic flowchart of a container isolation method for a netlink resource, in accordance with one or more embodiments. The method may include the following steps.

Step 300: An application program sends a trigger instruction to a kernel.

A container invokes a creation instruction by using a system, for example, invokes a clone( ) system call instruction of a CLONE_NEW* type, to create a namespace. The namespace may include an inter-process communication (IPC) namespace, a network namespace, a mount namespace, a PID namespace, a UNIX namespace (which isolates a host name and a network information service), and a user namespace. The CLONE_NEW* type may include CLONE_NEWIPC, CLONE_NEWNET, CLONE_NEWNS, CLONE_NEWPID, CLONE_NEWUTS, and CLONE_NEWUSER. These types respectively indicate resources isolated by namespaces.

A user sends the trigger instruction to the kernel by using the application program, and the trigger instruction is used to instruct the kernel to create a container, so as to create a netlink namespace for the container.

Step 310: The kernel creates, according to the trigger instruction, a container corresponding to the application program, creates a netlink namespace, and sends, to the application program, a notification indicating that the netlink namespace is successfully created.

The kernel establishes the container according to the trigger instruction, so as to establish the netlink namespace for the container. The netlink namespace may include an identifier, and the identifier may be information uniquely indicating the namespace, for example, an index node number (inode number). In addition, the kernel performs initialization configuration on another resource, to complete initialization of creation of the netlink namespace.

Then the kernel sends, to the application program, the notification indicating that the netlink namespace is successfully created.

Step 320: The kernel receives a first netlink message delivered by the container, where the first netlink message carries entries generated when the container runs, and the kernel stores the entries.

The kernel parses the first netlink message, to obtain the identifier of the netlink namespace.

The kernel stores the received entry in a corresponding namespace based on the identifier of the netlink namespace corresponding to the first netlink message. Specifically, the kernel may store the entry in a hash table of the namespace, so that user space of the container can find, based on the identifier of the netlink namespace, a related entry belonging to the user space.

Figure 4:
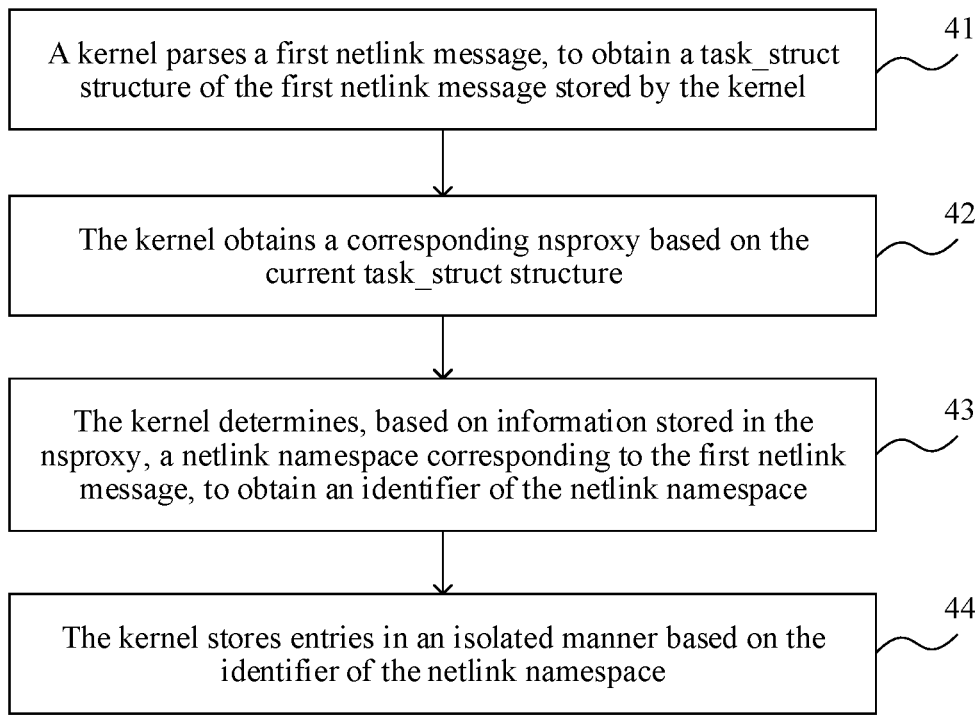
FIG. 4 is a flowchart of an entry storage method, in accordance with one or more embodiments.

FIG. 4 is a flowchart of an entry storage method, in accordance with one or more embodiments. As shown in FIG. 4, the method may include the following steps:

Step 41: The kernel parses the first netlink message, to obtain a task_struct structure of the first netlink message stored by the kernel.

Step 42: The kernel obtains, based on the current task_struct structure, a corresponding module (nsproxy) storing a namespace.

A pointer pointing to the nsproxy exists in the task_struct structure. Therefore, the kernel may obtain the corresponding nsproxy based on the current task_struct structure. Because the kernel provides a plurality of namespaces, such as a PID, IPC, and an NS, one process may belong to a plurality of namespaces. Because the nsproxy stores a group of pointers pointing to various types of namespaces, the nsproxy may manage all the namespaces to which the process belongs.

Step 43: The kernel determines, based on information stored in the nsproxy, a netlink namespace corresponding to the first netlink message, and obtains an identifier of the netlink namespace.

Step 44: The kernel stores the entries based on the identifier of the netlink namespace, to send, to user space of the container, an entry required by the container.

Optionally, the kernel may set a timing mechanism, so that an entry management system (or referred to as a subsystem) in the kernel periodically sends a netlink message in a multicast manner.

When the entry management system of the kernel periodically sends a netlink message in a multicast manner, or the user space of the container triggers the entry management system of the kernel to send a netlink message in a multicast manner, step 330 is performed.

It should be noted that a process in which the container generates an entry and an entry obtaining process may be different processes or a same process of a same container.

Step 330: The kernel obtains an identifier of a netlink namespace to which a target entry belongs.

When the kernel needs to send an entry (or referred to as the target entry) to the user space of the container, the entry management system of the kernel obtains the identifier, such as an inode number, of the netlink namespace to which the target entry belongs.

Step 340: The kernel determines a target netlink namespace based on the identifier of the netlink namespace, and sends the target entry to user space of the container in a unicast or multicast manner based on the identifier of the target netlink namespace.

The target entry is all or some of the entries generated by the container that are stored in the namespace of the kernel.

The kernel first obtains the corresponding nsproxy based on the identifier of the netlink namespace, and then determines, based on the pointer in the nsproxy, the netlink namespace corresponding to the target entry, to obtain the identifier of the netlink namespace, for example, a packet structure.

The kernel uses the identifier of the netlink namespace and the target entry as input parameters of a netlink_kemel_create function, to create a netlink kernel instance of the kernel, and creates a transmission channel between the container and the kernel, for example, a socket channel, so that the entry management system of the kernel sends the target entry to the user space of the container through the channel in a unicast or multicast manner. When a plurality of processes exist in the user space of the container, the entry management system of the kernel sends the target entry to the user space of the container through the transmission channel in a multicast manner. When only one process or only one process requiring the target entry exists in the user space of the container, the entry management system of the kernel sends the target entry to the user space of the container through the transmission channel in a unicast manner.

It can be learned that in a created netlink namespace mechanism, a netlink message sent by the entry management system in the kernel is received only by user space of a container generating an entry carried in the netlink message, thereby isolating netlink channels.

Figure 5:
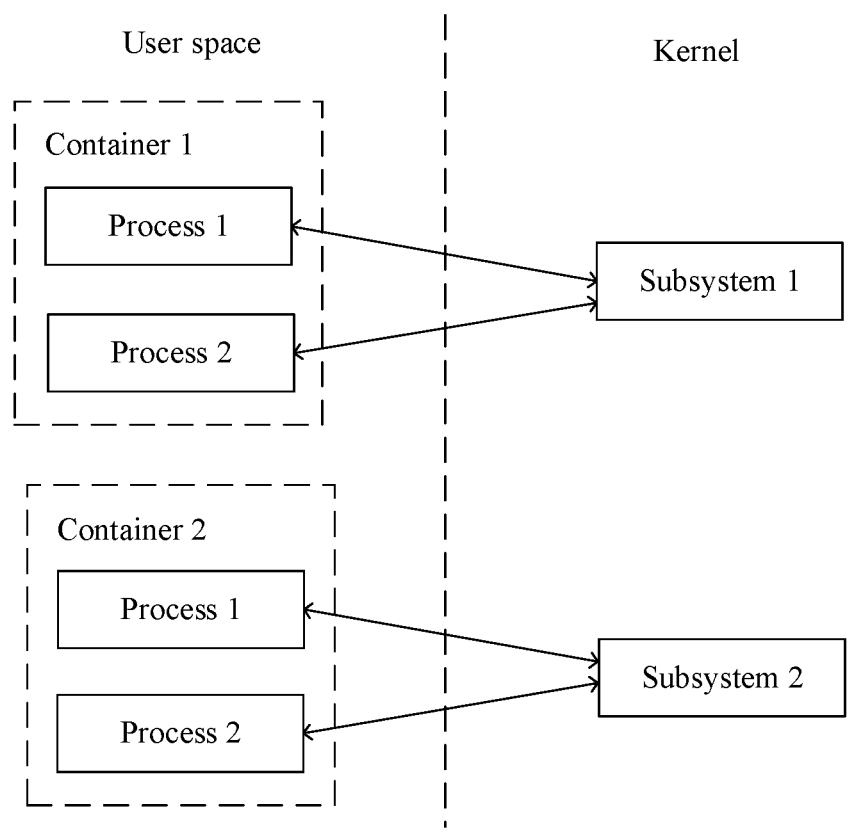
FIG. 5 is a schematic diagram of a process of transmitting a netlink message through an isolated netlink channel, in accordance with one or more embodiments.

In an example, FIG. 5 is a schematic diagram of a process of transmitting a netlink message through an isolated netlink channel, in accordance with one or more embodiments. As shown in FIG. 5, a netlink message sent in a unicast or multicast manner by a subsystem 1 that corresponds to a container 1 and that is in the kernel can be received only by a process 1 and a process 2 in the container 1, and a process 1 and a process 2 in a container 2 cannot receive the netlink message; and a netlink message sent in a unicast or multicast manner by a subsystem 2 that corresponds to the container 2 and that is in the kernel can be received only by the process 1 and the process 2 in the container 2, and the process 1 and the process 2 in the container 1 cannot receive the netlink message.

Figure 6:
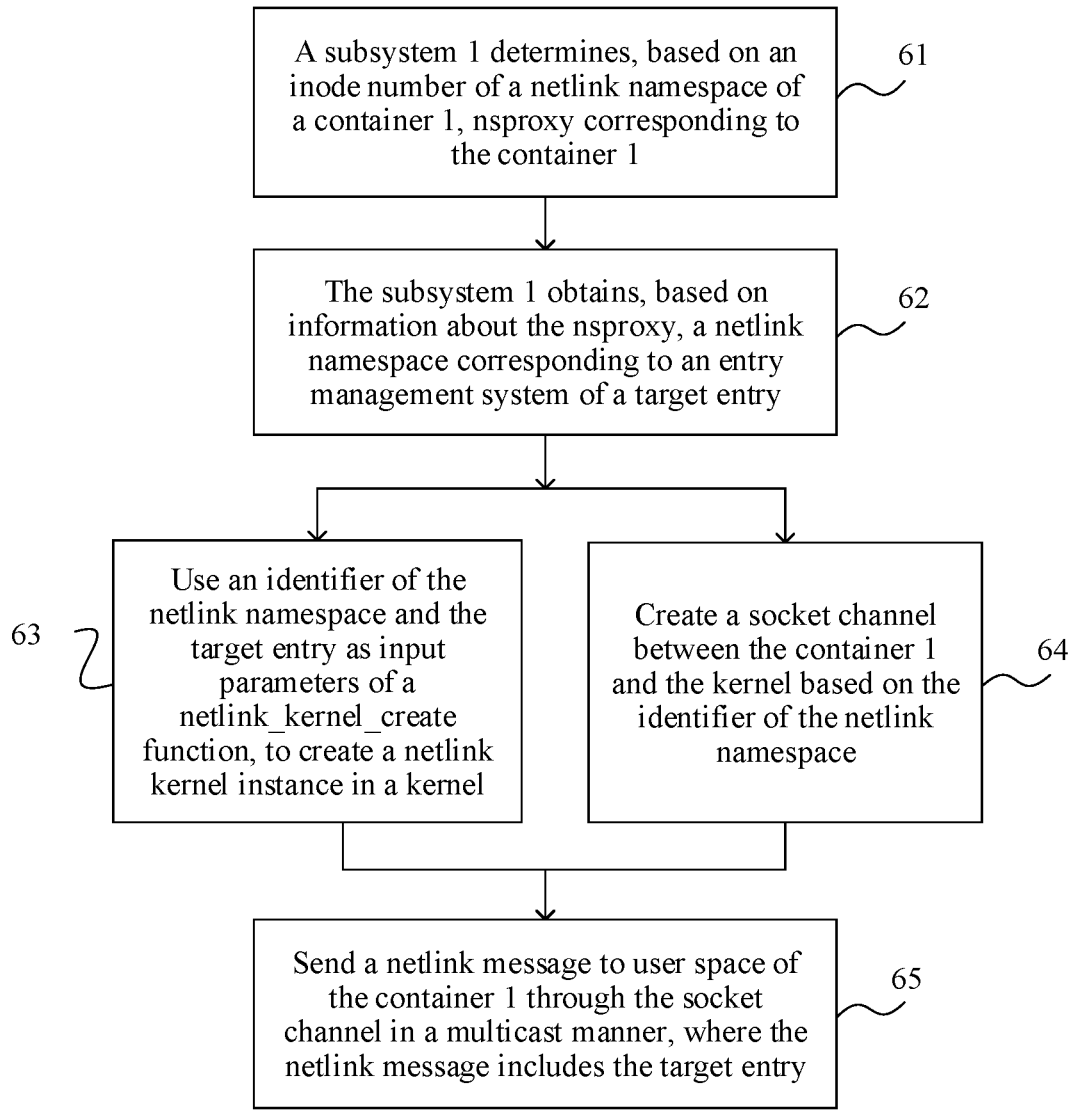
FIG. 6 is a flowchart of a method for transmitting an entry to a container by a kernel, in accordance with one or more embodiments.

In an example, FIG. 6 is a flowchart of a method for transmitting an entry to a container by a kernel, in accordance with one or more embodiments. As shown in FIG. 6, the method may include the following steps:

Step 61: A subsystem 1 that is located in the kernel and that corresponds to a container 1 determines, based on an inode number of a netlink namespace of the container 1, nsproxy corresponding to the container 1.

Step 62: The subsystem 1 obtains, based on information about the nsproxy, a netlink namespace corresponding to an entry management system (namely, an entry management system of the subsystem 1) of a target entry.

Step 63: Use an identifier of the netlink namespace and the target entry as input parameters of a netlink_kernel_create function, to create a netlink kernel instance in the kernel.

Step 64: Create a socket channel between the container 1 and the kernel based on the identifier of the netlink namespace.

Step 65: Send a netlink message to user space of the container 1 through the socket channel in a multicast manner, where the netlink message includes the target entry.

Optionally, in some scenarios, an entry that is of the container and that is stored in the kernel is released to a forwarding process (for example, a user mode vSwitch) of the user space of the container. In this way, data is forwarded in the user space, to reduce a data forwarding delay, and improve user experience.

Further, in this embodiment of this application, the entry of the container is sent to a common forwarding plane used for inter-container communication, thereby implementing inter-container data forwarding. The method is performed after the kernel stores the entries in an isolated manner (step 320). The method is described below in detail.

Step 350: The kernel creates a second netlink message, where the second netlink message includes a netlink namespace type and a target entry.

The second netlink message is a netlink message sent by the kernel to the forwarding plane used for inter-container communication.

The kernel adds a new netlink namespace type (for example, NLM_F_NETLINK_NAMESPACE 32) to a netlink message header, to implement communication with the forwarding plane.

Figure 7:
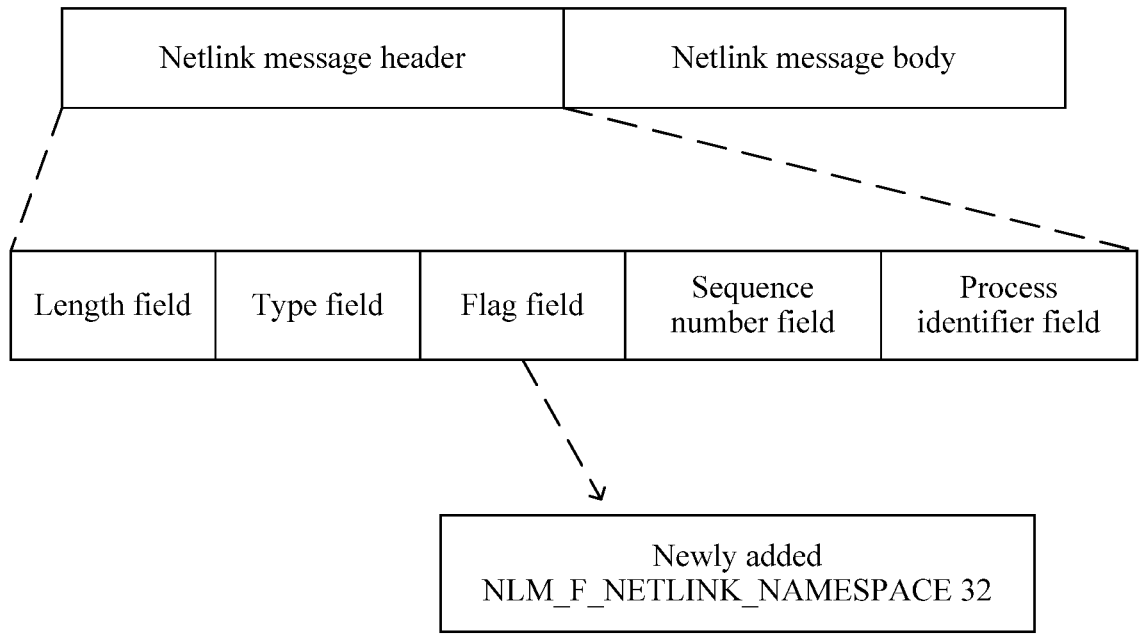
FIG. 7 is a schematic structural diagram of a netlink message, in accordance with one or more embodiments.

FIG. 7 is a schematic structural diagram of a netlink message, in accordance with one or more embodiments. As shown in FIG. 7, the netlink message includes a netlink message header and a netlink message body, and the netlink message header includes a length field, a type field, a flag field, a sequence number field, and a process identifier (identifier, ID) field.

The length field specifies a total message length, and occupies four bytes. The type field is used to define a message type in an application, and occupies two bytes. The flag field is used to set a message identifier, and occupies two bytes. The sequence number field is used to trace a message, indicates a sequence number, and occupies four bytes. The process identifier field is used to trace a message, indicates a message source process ID, and occupies four bytes.

The kernel adds NLM_F_NETLINK_NAMESPACE 32 to a flag field (an nlmsg flags parameter) of the netlink message header, to indicate that the netlink message is a message about a netlink namespace.

The target entry is all or some of the entries sent by the container to the kernel.

Step 360: The kernel sends the second netlink message to a forwarding plane used for inter-container communication.

The forwarding plane used for inter-container communication is a common forwarding plane, and may be a virtual switch (vSwitch) on a host on which the container and the kernel are located.

Optionally, the kernel may periodically send the second netlink message to the forwarding plane. Specifically, a kernel subsystem corresponding to a container periodically sends, to the forwarding plane, a second netlink message including a target entry corresponding to the container.

Step 370: The forwarding plane parses the second netlink message, to obtain an identifier of a netlink namespace to which the target entry belongs.

Optionally, the second netlink message may also include the identifier, such as a first inode number, of the netlink namespace to which the target entry belongs.

Step 380: The forwarding plane determines, based on the identifier of the netlink namespace to which the target entry belongs, a container corresponding to the target entry.

Before step 380 is performed, the forwarding plane obtains an identifier, such as a second inode number, of a netlink namespace of each container on a host on which the forwarding plane is located.

The forwarding plane performs matching between the first inode number and the second inode number of the netlink namespace of each container on the forwarding plane. If the matching succeeds, in other words, the first inode number is the same as the second inode numbers, the forwarding plane determines that a container to which the second inode number belongs is a target container receiving the target entry. In other words, the forwarding plane identifies consistency between the first inode number and the second inode number, to determine the target container corresponding to the target entry.

Figure 8:
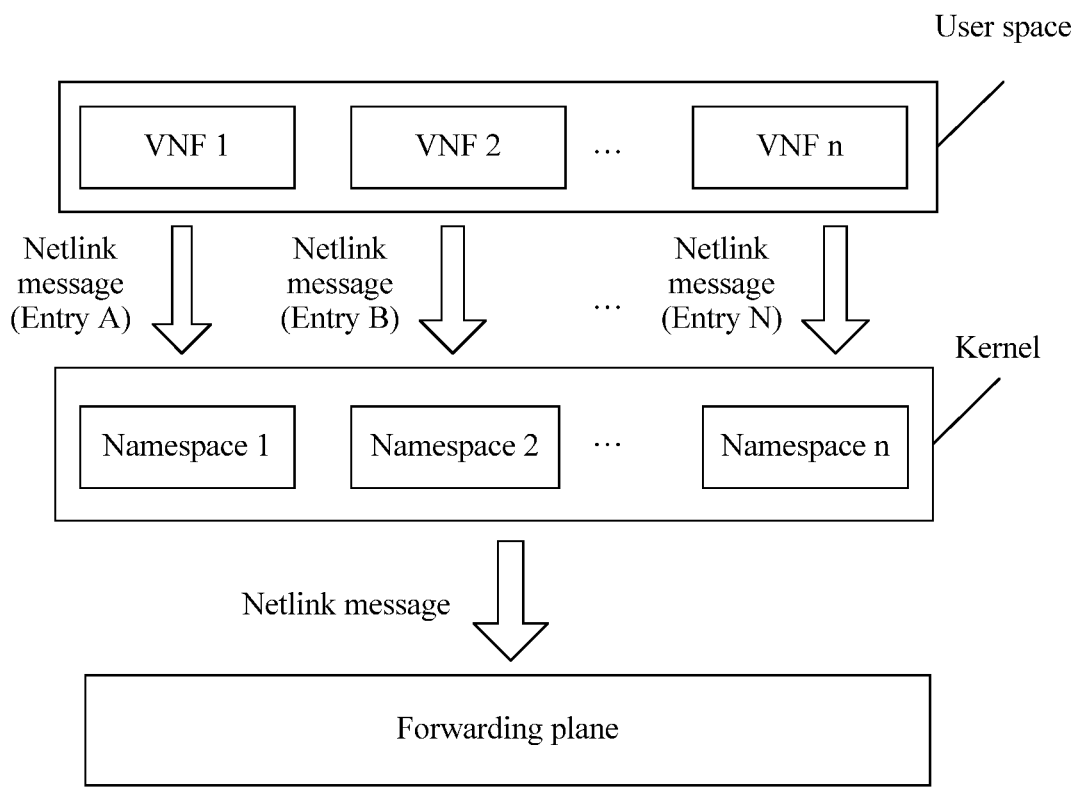
FIG. 8 is a schematic diagram of an entry forwarding process in user space, in accordance with one or more embodiments.

In an example, FIG. 8 is a schematic diagram of an entry forwarding process in user space, in accordance with one or more embodiments. As shown in FIG. 8, an application program on a server deploys virtual network function (VNF) container instances VNF 1, VNF 2, . . . , and VNF n by using an application container engine (docker); and after creating the VNF containers, the kernel correspondingly creates netlink namespaces of the VNF containers, such as a namespace 1, a namespace 2, . . . , and a namespace n. A VNF container has a private entry. A private entry A of the container VNF 1 is sent to the kernel by using a netlink message 1, and is stored by the kernel in the namespace 1 in an isolated manner. A private entry B of the container VNF 2 is sent to the kernel by using a netlink message 2, and is stored by the kernel in the namespace 2 in an isolated manner. By analogy, a private entry N of the container VNF n is sent to the kernel by using a netlink message n, and is stored by the kernel in the namespace n in an isolated manner.

Further, the private entry in the kernel (for example, at least one entry of the entry A, the entry B, . . . , and the entry N) may be synchronized, by using a netlink message, to a forwarding plane used for inter-container communication, for example, a fast path. The fast path parses the netlink message to obtain an inode number of a netlink namespace to which the entry belongs. The fast path determines a target VNF container of the entry based on the obtained inode number of the netlink namespace to which the entry belongs and inode numbers of the netlink namespaces of all the VNF containers. In other words, the fast path establishes an association relationship between a VNF container instance and an entry by using an inode number. Data may be exchanged between VNF container instances by using the fast path.

After the VNF 1 and the VNF 2 send entries to the kernel, and then the kernel releases the entries of the VNF 1 and the VNF 2 to the fast path, the VNF 1 may directly exchange data with the VNF 2 by using the fast path.

It can be learned that according to the method, a netlink namespace mechanism is created, to isolate netlink channels, and reduce broadcast storms of netlink messages, thereby improving efficiency of processing a netlink multicast packet.

Figure 9:
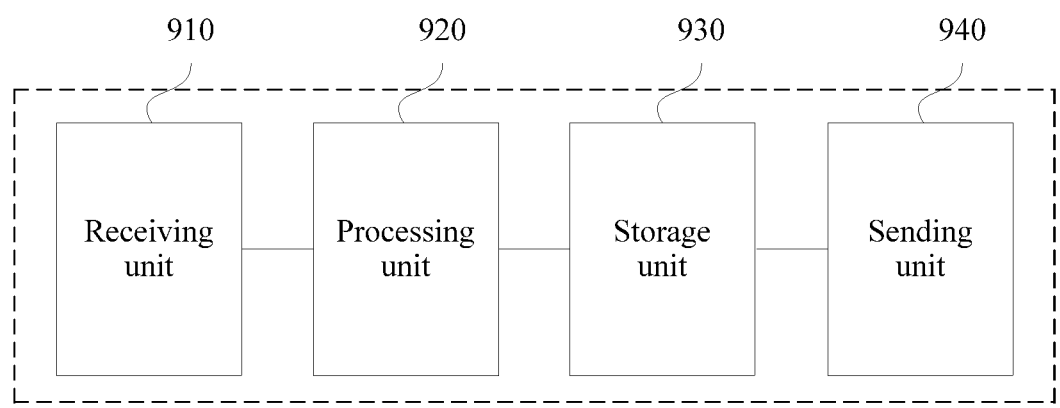
FIG. 9 is a schematic structural diagram of a container isolation apparatus for a netlink resource, in accordance with one or more embodiments.

Corresponding to the foregoing method, an embodiment further provides a container isolation apparatus for a netlink resource. As shown in FIG. 9, the apparatus may include: a receiving unit 910, a processing unit 920, a storage unit 930, and a sending unit 940.

The receiving unit 910 is configured to receive a trigger instruction that is used to create a container and that is delivered by an application program.

The processing unit 920 is configured to: create, according to the trigger instruction, a container corresponding to the application program, and establish a netlink namespace for the container.

The sending unit 940 is configured to send, to the application program, a notification indicating that the netlink namespace is successfully created.

The receiving unit 910 is further configured to receive a first netlink message delivered by the container, where the first netlink message includes entries generated when the container runs.

The storage unit 930 is further configured to store the entries based on an identifier of the netlink namespace, so that an entry required by the container is sent to user space of the container.

Optionally, the processing unit 920 is further configured to parse a message type of the first netlink message, to obtain the identifier of the netlink namespace.

Optionally, the apparatus further includes the sending unit 940.

The processing unit 920 is further configured to: determine an identifier of a netlink namespace corresponding to a target entry in the entries, and determine a target netlink namespace based on the identifier of the netlink namespace.

The sending unit 940 is configured to send the target entry to the user space of the container in a unicast or multicast manner based on an identifier of the target netlink namespace.

Optionally, the processing unit 920 is further configured to create a transmission channel between the container and the kernel based on the identifier of the target netlink namespace and the target entry.

The sending unit 940 is configured to send the target entry to the user space of the container through the channel in a unicast or multicast manner.

Optionally, the sending unit 940 is further configured to send a second netlink message to a forwarding plane used for inter-container communication, where the second netlink message includes a netlink namespace type and a target entry, so that the forwarding plane obtains an identifier of a netlink namespace to which the target entry belongs, and determines, based on the identifier of the netlink namespace to which the target entry belongs, a container corresponding to the target entry, where the target entry is all or some of the stored entries.

For problem-resolving implementations and beneficial effects of the units of the apparatus in the embodiment, refer to the implementations and the beneficial effects of the method. Therefore, details are not described herein again.

Figure 10:
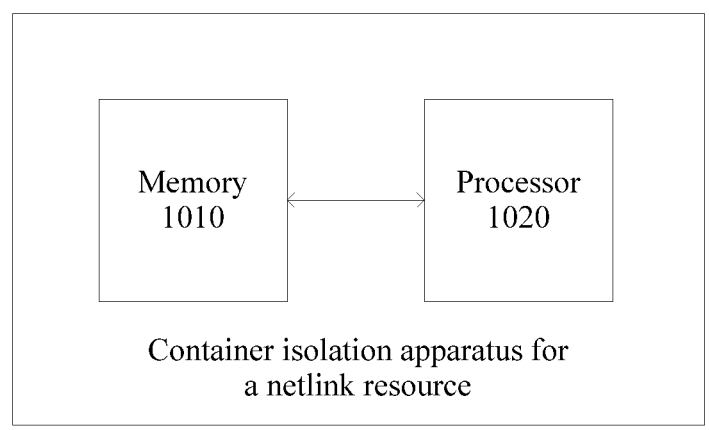
FIG. 10 is a schematic structural diagram of another container isolation apparatus for a netlink resource, in accordance with one or more embodiments.

FIG. 10 is a schematic structural diagram of another container isolation apparatus for a netlink resource, in accordance with one or more embodiments. With development of cloudification and a VNF technology, the apparatus may be deployed on a server in a VNF form. The apparatus is applicable to the server, a network device, and the like (provided that a container technology can be deployed) that are not limited to a central processing unit (CPU). As shown in FIG. 10, the apparatus may include a memory 1010 and a processor 1020.

The memory 1010 may be connected to the processor 1020 by using a bus. The memory 1010 may be a nonvolatile memory, such as a hard disk drive or a flash memory, and the memory 1010 has a software program and a device driver. The software program can execute various functions of the foregoing method, and the device driver may be a network and interface driver.

The processor is configured to execute the software program, and when the program is executed, the method can be implemented accordance with one or more embodiments.

For problem-resolving implementations and beneficial effects of the components of the apparatus in the embodiment, refer to the implementations and the beneficial effects of the method. Therefore, details are not described herein again.

It should be noted that an embodiment further provides a computer readable storage medium. The computer readable storage medium stores a computer program, and the program is executed by a processor 1020.

An embodiment further provides a computer program product including an instruction. When the computer program product runs on a computer, a processor 1020 performs the method in FIG. 3.

Steps of methods or algorithms described in the embodiments disclosed in this specification may be implemented by hardware, a software module executed by a processor, or a combination thereof. A software instruction may include a corresponding software module. The software module may be stored in a random access memory, a flash memory, a read-only memory, an erasable programmable read-only memory (EPROM), an electrically erasable programmable read-only memory (EEPROM), a hard disk, an optical disc, or any other type of storage medium well-known in the art. For example, a storage medium is coupled to a processor, so that the processor can read information from the storage medium and write information into the storage medium. The storage medium may alternatively be a component of the processor. The processor and the storage medium may also exist in user equipment as discrete components.

The objectives, technical solutions, and benefits of this application are further described in detail in the foregoing specific implementations. It should be understood that the foregoing descriptions are merely specific implementations of this application, but are not intended to limit the protection scope of this application. Any modification or improvement made based on the technical solutions of this application shall fall within the protection scope of this application.

What is claimed is:

1. A container isolation method for a netlink resource, the method comprising:
   receiving, by a kernel executed by a processor, a trigger instruction from an application program;
   creating, by the kernel according to the trigger instruction, a container corresponding to the application program, creating a netlink namespace for the container, and sending a notification to the application program indicating that the netlink namespace is created;
   receiving, by the kernel, a netlink message from the container, wherein the netlink message comprises entries generated when the container runs;
   storing, by the kernel, the entries based on an identifier of the netlink namespace for the container, to send an entry required by the container to user space of the container;
   determining, a target entry among the stored entries;
   determining, by the kernel, an identifier of a netlink namespace corresponding to the target entry;
   determining, by the kernel, a target netlink namespace based on the identifier of the netlink namespace; and
   sending, by the kernel, the target entry to the user space of the container based on the identifier of the target netlink namespace.

2. The method according to claim 1, further comprising:
   parsing, by the kernel, the netlink message, to obtain the identifier of the netlink namespace.

3. The method according to claim 2, wherein the netlink message is a first netlink message, the container corresponding to the application program is a first container, and the method further comprises:
   sending, by the kernel, a second netlink message to a forwarding plane used for inter-container communication,
   wherein
     the second netlink message comprises a netlink namespace type and the target entry, so that the forwarding plane obtains an identifier of a netlink namespace to which the target entry belongs, and the forwarding plane determines, based on the identifier of the netlink namespace to which the target entry belongs, a second container corresponding to the target entry.

4. The method according to claim 2,
   wherein the target entry is sent to the user space of the container in a unicast or multicast manner based on the identifier of the target netlink namespace.

5. The method according to claim 4, wherein the sending of the target entry to the user space of the container comprises:
   creating, by the kernel, a transmission channel between the container and the kernel based on the target entry and the identifier of the target netlink namespace; and
   sending, by the kernel, the target entry to the user space of the container through the transmission channel in the unicast or multicast manner.

6. The method according to claim 1, wherein the netlink message is a first netlink message, the container corresponding to the application program is a first container, and the method further comprises:
   sending, by the kernel, a second netlink message to a forwarding plane used for inter-container communication, wherein the second netlink message comprises a netlink namespace type and the target entry, so that the forwarding plane obtains an identifier of a netlink namespace to which the target entry belongs; and
   determining, based on the identifier of the netlink namespace to which the target entry belongs, a second container corresponding to the target entry.

7. The method according to claim 1,
   wherein the target entry is sent to the user space of the container in a unicast or multicast manner based on the identifier of the target netlink namespace.

8. The method according to claim 7, wherein the sending of the target entry to the user space of the container comprises:
   creating, by the kernel, a transmission channel between the container and the kernel based on the target entry and the identifier of the target netlink namespace; and
   sending, by the kernel, the target entry to the user space of the container through the transmission channel in the unicast or multicast manner.

9. A container isolation apparatus for a netlink resource, wherein the apparatus comprises:
   a processor; and
   a memory having computer readable instructions stored thereon that, when executed by the processor, cause the apparatus to:
   receive a trigger instruction from an application program;
   create, according to the trigger instruction, a container corresponding to the application program, create a netlink namespace for the container, and send a notification to the application program indicating that the netlink namespace is created;
   receive a netlink message from the container, wherein the netlink message comprises entries generated when the container runs;
   store the entries based on an identifier of the netlink namespace for the container to send an entry required by the container to user space of the container;
   determine a target entry among the stored entries;
   determine, by the kernel, an identifier of a netlink namespace corresponding to the target entry;
   determine, by the kernel, a target netlink namespace based on the identifier of the netlink namespace; and
   send the target entry to the user space of the container based on the identifier of the target netlink namespace.

10. The container isolation apparatus according to claim 9, wherein the apparatus is further caused to:
    parse the netlink message to obtain the identifier of the netlink namespace.

11. The container isolation apparatus according to claim 10, wherein the netlink message is a first netlink message, the container corresponding to the application program is a first container, and the apparatus is further caused to:
    send a second netlink message to a forwarding plane used for inter-container communication, wherein
    the second netlink message comprises a netlink namespace type and the target entry, so that the forwarding plane obtains an identifier of a netlink namespace to which the target entry belongs, and the forwarding plane determines, based on the identifier of the netlink namespace to which the target entry belongs, a second container corresponding to the target entry.

12. The container isolation apparatus according to claim 10, wherein
    the target entry target entry is sent to the user space of the container in a unicast or multicast manner based on the identifier of the target netlink namespace.

13. The container isolation apparatus according to claim 12, wherein the sending of the target entry to the user space of the container comprises:
creating a transmission channel based on the target entry and the identifier of the target netlink namespace; and
sending the target entry to the user space of the container through the transmission channel in the unicast or multicast manner.

14. The container isolation apparatus according to claim 9, wherein the netlink message is a first netlink message, the container corresponding to the application program is a first container, and the apparatus is further caused to:
send a second netlink message to a forwarding plane used for inter-container communication, wherein the second netlink message comprises a netlink namespace type and the target entry, so that the forwarding plane obtains an identifier of a netlink namespace to which the target entry belongs; and
determine, based on the identifier of the netlink namespace to which the target entry belongs, a second container corresponding to the target entry.

15. The container isolation apparatus according to claim 9, wherein
the target entry target entry is sent to the user space of the container in a unicast or multicast manner based on the identifier of the target netlink namespace.

16. The container isolation apparatus according to claim 15, wherein the sending of the target entry to the user space of the container comprises:
creating a transmission channel based on the target entry and the identifier of the target netlink namespace; and
sending the target entry to the user space of the container through the transmission channel in the unicast or multicast manner.

17. A non-transitory computer readable memory having computer readable instructions stored thereon that, when executed by a processor, cause an apparatus to:
receive a trigger instruction from an application program;
create, according to the trigger instruction, a container corresponding to the application program, create a netlink namespace for the container, and send a notification to the application program indicating that the netlink namespace is created;
receive a netlink message from the container, wherein the netlink message comprises entries generated when the container runs;
store the entries based on an identifier of the netlink namespace for the container to send an entry required by the container to user space of the container;
determine a target entry among the stored entries;
determine, by the kernel, an identifier of a netlink namespace corresponding to the target entry;
determine, by the kernel, a target netlink namespace based on the identifier of the netlink namespace; and
send the target entry to the user space of the container based on the identifier of the target netlink namespace.

18. The non-transitory computer readable memory according to claim 17, wherein the apparatus is further caused to:
parse the netlink message to obtain the identifier of the netlink namespace.

19. The non-transitory computer readable memory according to claim 18, wherein the netlink message is a first netlink message, the container corresponding to the application program is a first container, and the apparatus is further caused to:
send a second netlink message to a forwarding plane used for inter-container communication, wherein
the second netlink message comprises a netlink namespace type and the target entry, so that the forwarding plane obtains an identifier of a netlink namespace to which the target entry belongs, and the forwarding plane determines, based on the identifier of the netlink namespace to which the target entry belongs, a second container corresponding to the target entry, and
the target entry is one or more of the stored entries.

20. The non-transitory computer readable memory according to claim 18, wherein
the target entry target entry is sent to the user space of the container in a unicast or multicast manner based on the identifier of the target netlink namespace.

* * * * *